United States Patent [19]

Thompson

[11] 3,906,241
[45] Sept. 16, 1975

[54] APPARATUS FOR USE IN ANALYSING FLUIDS

[76] Inventor: John Michael Thompson, 22 Greenside, Harborne, Birmingham, England, B17, OBT

[22] Filed: May 23, 1974

[21] Appl. No.: 472,878

[30] Foreign Application Priority Data
May 23, 1973 United Kingdom............... 24613/73

[52] U.S. Cl. ................. 250/574; 250/227; 250/575; 356/75; 350/96 B
[51] Int. Cl.² ......................................... G01N 21/26
[58] Field of Search ........... 250/227, 573, 574, 575, 250/564, 565; 356/180, 181, 184, 185, 75; 350/96 B

[56] References Cited
UNITED STATES PATENTS

| | | | |
|---|---|---|---|
| 2,892,378 | 6/1959 | Canada........................... | 250/574 X |
| 3,068,742 | 12/1962 | Hicks, Jr. et al................ | 250/227 X |
| 3,141,094 | 7/1964 | Strickler ........................ | 250/574 X |
| 3,263,553 | 8/1966 | Baruch........................... | 356/184 X |
| 3,447,876 | 6/1969 | Barringer........................ | 356/75 X |
| 3,508,830 | 4/1970 | Hopkins et al.................. | 250/574 X |
| 3,704,951 | 12/1972 | Chupp ............................ | 356/75 |

*Primary Examiner*—Walter Stolwein
*Attorney, Agent, or Firm*—Scrivener Parker Scrivener and Clarke

[57] ABSTRACT

Apparatus for use in analysing liquids or gases comprises a probe comprising a detecting head and a body of elongated shape extending from the detecting head. The body incorporates three fibre optics channels which extend lengthwise of the body. In use radiation of known wavelength or wavelengths is directed along the first channel, crosses a gap containing fluid to be analysed and returns along the second channel. Ramam radiation scattered by the fluid in the gap passes along the third channel to a location remote from the head where it is detected for analysis.

9 Claims, 10 Drawing Figures

APPARATUS FOR USE IN ANALYSING FLUIDS

This invention relates to apparatus for use in analysing fluids.

In a known method analysing fluids a sample of the fluid is illuminated with a beam of light of a known wavelength, such as light from a laser, and the light scattered from the fluid is observed. Most of the scattered light is of the same wavelength as that of the incident light, and is referred to as Rayleigh light. Some of the scattered light, however, is of wavelengths different from the wavelength of the incident light, this being referred to as Raman radiation. The wavelengths of the Raman radiation are characteristic of the chemical constitution of the fluid sample, and by observing whether radiations of wavelengths associated with particular compounds are present it is possible to determine whether those compounds are or are not present in the sample.

In the laboratory it has been the usual practice to mount the laser in fixed relationship to a vessel containing the sample of fluid to be analysed, and to use a spectroscope to enable the Raman radiation to be detected and analysed.

Such arrangements are suitable for the analysis of samples of fluids contained in closed transparent vessels but cannot readily be used for the analysis of samples in other locations, for example fluids inside living organisms.

An aim of the present invention is to provide apparatus which can enable fluids to be analysed in a wider range of locations and in a wider range of conditions than has previously been possible.

According to the present invention there is provided apparatus for use in analysing fluids comprising a probe comprising a detecting head and a body of elongated shape extending from the detecting head and incorporating three fibre optics channels extending lengthwise of the body and such that radiation of known wavelength or wavelengths can be directed along the first channel and can be returned along the second channel after crossing a gap at the detecting head which can contain a fluid to be analysed, while Raman radiation scattered by that fluid in the gap can pass along the third channel from the detecting head to a location remote from the head where it can be detected for analysis.

Apparatus embodying the invention is intended for use in the following manner. A fluid, that is a liquid or a gas, to be analysed is introduced into the gap in the detecting head. Radiation of known wavelength or wavelengths, such as light from a laser, is directed lengthwise of the body of the probe along the first fibre optics channel. The radiation is caused to cross the gap and returns from the head along the second fibre optics channel. As the radiation crosses the gap and passes through the fluid a small proportion of the radiation will be scattered and produce radiation of different wavelengths from that or those of the incident radiation crossing the gap.

For the purposes of this specification all the scattered radiation of wavelengths different from the wavelengths of the incident radiation is referred to as Raman radiation. Elsewhere the term Raman radiation is sometimes used to denote scattered radiation only of wavelengths longer than the wavelength of the incident radiation (also called Stokes radiation), while the term anti-Stokes radiation is used to denote scattered radiation of wavelengths shorter than the wavelength of the incident radiation. For convenience, however, the term Raman radiation is used herein to denote the scattered radiation of wavelengths both longer and shorter than the wavelength of the incident radiation. Nevertheless, it is generally the case that the intensity of the Raman radiation with increased wavelength is greater than the intensity of the Raman radiation with reduced wavelength, so that in practice it is generally more convenient to detect and analyse only the radiation of increased wavelength. Some of the scattered Raman radiation travels from the head along the third fibre optics channel and on issuing from that channel can be detected and analysed. As mentioned above, the relationship between the wavelengths of the Raman radiation and that or those of the incident radiation is characteristic of the chemical constitution of the fluid in the gap.

As the intensity of the Raman radiation is relatively small as compared with that of the incident radiation it is normally desirable to use incident radiation of relatively high intensity. Radiation from a laser is often particularly suitable. If the incident radiation were merely absorbed at the head after passing across the gap considerable heat would be generated at the head. The apparatus may for example be used with a laser generating light with a power of 1 watt. One of the principal reasons for providing a second fibre optics channel, for the return of the incident radiation, is to avoid that difficulty. Further, as the apparatus would usually be used with coherent radiation, such as is derived from a laser, difficulties with standing waves would arise if the radiation were returned along the same fibre optics channel as that used to transmit the radiation to the head. This again is a reason for causing the returning radiation to pass along a different channel from that along which the incident radiation passes.

The body of the probe may be flexible so that it can be inserted into places where it might otherwise be difficult to locate the head. Further, the use of a probe with a flexible body enables the head to be mounted at a location where it may be caused to move slightly in relation to the location where the radiation is analysed, such movement being due to factors such as changes in temperature.

In one type of apparatus embodying the invention each of the fibre optics channels comprises a plurality of individual fibres, while in another type of apparatus embodying the invention each of the first and second fibre optics channels comprises a single fibre, preferably of the kind referred to as a rigid fibre, a typical rigid fibre being 1.75 mm in diameter. Where multiple fibres are used the body can usually be made more flexible than when so-called rigid fibres are used, though in the latter case the body can still be made somewhat flexible.

The head is normally provided with at least one opening enabling the fluid to be analysed to enter the gap from a quantity of fluid into which the head is inserted. If there is only a single opening in the head and leading to the gap the fluid may diffuse across the gap. If there are two openings in the head, with the gap between them, the fluid may be caused positively to flow across the gap from one opening to the other.

The probe may be constructed so as to be relatively narrow. The head, in fact, is preferably of little or no greater cross-section than the body of the probe. In a preferred arrangement the fibre optics channels extend through a sheath, part of which sheath constitutes the side wall of the head. The sheath may be made of any suitable material or materials. If the body of the probe is to be flexible the sheath may be of p.v.c. or a silicone rubber, while a less flexible probe may have a metal sheath. If part of the sheath constitutes the side wall of the head it is likely that the sheath or that part of the sheath forming part of the head and surrounding the adjacent end portions of the fibre optics channels would be made of metal. In a typical embodiment the wall-thickness of the sheath is 1 mm. Although the head would normally be disposed at one end of the body that arrangement is not absolutely essential to the invention. The body of a typical probe used for the analysis of respiratory gases, and in use inserted into a patient's trachea is between 5 mm and 7 mm in diameter.

In preferred arrangements the three fibre optics channels lie alongside one another throughout the length of the body. Preferably each of the first and second fibre optics channels is of circular cross-section, and those channels are embedded in the third fibre optics channel which is of a diameter greater than the sum of the diameters of the first and second channels, part of the third channel extending between the first and second channels.

Reflecting means is preferably provided in the head to direct the radiation from the first channel to the second channel. The radiation may, for example, leave the first channel in a direction lengthwise of the probe, strike a first reflective surface which directs the reflected radiation transversely of the head, across part of the gap, onto a second reflective surface which directs the radiation back along the second channel lengthwise of the probe. The two reflective surfaces may be at 45° to the longitudinal axis of the adjacent part of the probe. If, however, they are inclined less steeply to that axis the arrangement can be made such that the radiation passes to and fro several times between the reflective surfaces before being directed along the second channel. Such an arrangement leads to an increase in the intensity of the Raman radiation. At least one additional reflective surface may be disposed around the gap to direct some of the Raman radiation along the third channel which would otherwise not be directed along that channel.

Embodiments of the present invention are illustrated in the accompanying drawings, in which.

Figure 1:
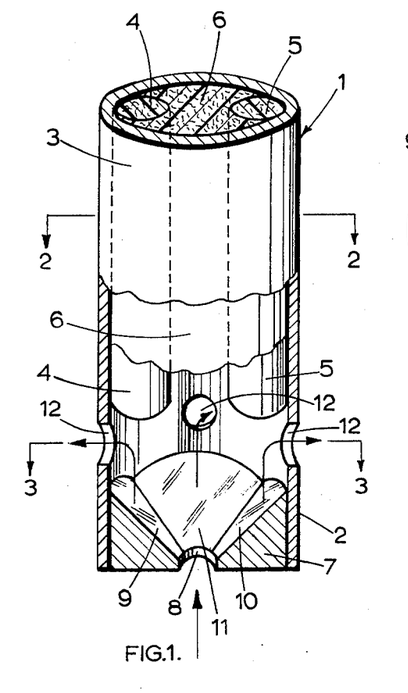
FIG. 1 is a perspective view, partly broken away, of the head end of one form of a probe in accordance with the invention.
Figure 2:
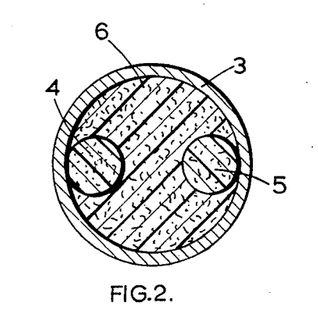
FIG. 2 is a section along the line 2—2 of FIG. 1.
Figure 3:
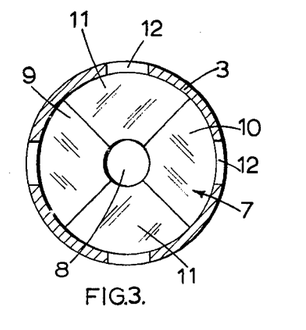
FIG. 3 is a section along the line 3—3 of FIG. 1.

The apparatus illustrated in FIGS. 1 to 3 comprises a probe comprising a body 1 of elongated shape with a head 2 at one end thereof. The probe is of circular cross-section and has a tubular metal sheath 3. The body 1 includes three fibre optics elements 4, 5 and 6. Two of those elements, 4 and 5, are of uniform circular cross-section, each having a diameter about one third of the outside diameter of the probe. The two circular-section elements 4 and 5 are spaced apart as far as possible in the probe so that their outermost parts touch the sheath 3. The third fibre optics element 6 occupies the remainder of the interior of the sheath and is thus of circular outline in cross-section though two smaller circular portions in its interior are occupied by the two smaller elements 4 and 5.

The ends of the three elements 4, 5 and 6 lie in a common plane normal to the cylinder axis of the head 2. The other end of the head 2 is partially closed by an insert 7 which may be made of a metal such as brass, platinum or white gold. There is a circular hole 8 at the centre of the insert 7, its diameter being rather less than a third of the diameter of the head 2, the hole 8 serving to enable fluid to enter the head.

Facing the ends of the first and second fibre optics elements 4 and 5 the inner surface of the insert 7 is shaped to provide planar surfaces 9 and 10 at 45° to the axis of the head. The surfaces 9 and 10 may be plated with gold or rhodium and constitute mirrors. The arrangement is such that in use radiation from the first element 4 falls on the adjacent mirror 9, traverses the interior of the head 2 at right angles to the axis, falls on the other mirror 10 and is reflected onto the adjacent end of the second fibre optics element 5. The three-part space through which the radiation travels in passing from the element 4 to the element 5 constitutes the gap referred to above.

A pair of subsidiary mirrors 11, similar to mirrors 9 and 10 are also formed in the head 2. The planes of the mirrors 9, 10 and 11 correspond to the planes of a four-sided symmetrical pyramid co-axial with the head and with an apex angle of 45°. In use, Raman radiation scattered from fluid in the gap is directed from the gap in all directions. Some passes directly into the third fibre optics element 6, while some is reflected into that element 6 from the subsidiary mirrors 11.

Between the insert 7 and the adjacent end of the body 1 the sheath 3 is formed with a plurality of holes 12. In a modified construction (not illustrated) the holes 12 are omitted.

Figure 4:
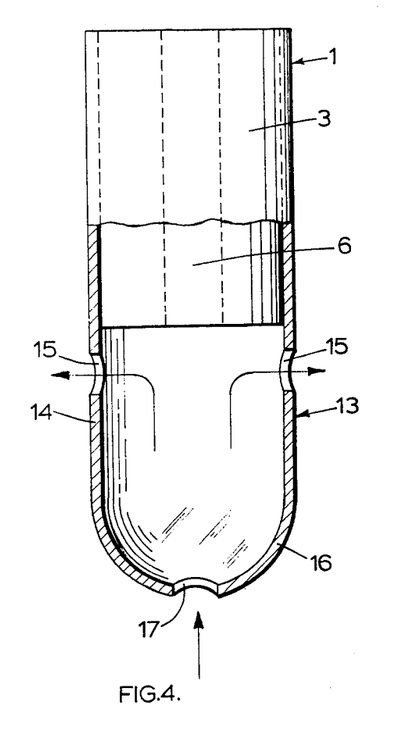
FIG. 4 is a side view, partly broken away to reveal the interior, of the head end of another form of probe, in accordance with the invention.

In the alternative form of head shown in FIG. 4 the end of the sheath 3 is so shaped as to constitute a head 13. The head 13 includes a cylindrical portion 14 formed with holes 15 (two in the example illustrated), and a hemispherical portion 16 with a central, axial hole 17. The inside surface of the hemispherical portion 16 is reflective, so that light from the element 4 is reflected from that part of the surface which it strikes.

Some of the reflected light crosses the interior of the head and after being reflected a second time passes to the element 5. Other rays are reflected a plurality of times before passing to the element 5. Yet further rays may escape through the element 6. Nevertheless the relative intensities of the Raman radiation and the reflected radiation passing through the element 6 are such that the Raman radiation is not swamped by the reflected radiation and can readily be detected and analysed.

In another alternative form of head (not illustrated) the arrangement is very similar to that in FIGS. 1 to 3, but the mirrors are inclined less steeply than 45° to the axis of the head. The radiation from the element 4 therefore has to pass to and fro several times between the mirrors 9 and 10 before it can escape by passing through the element 5. This effectively increases the mean length of gap and thus increases the intensity of the Raman radiation. A similar effect tends to occur, though to a rather lesser extent, with heads of the kind shown in FIG. 4.

Figure 5:
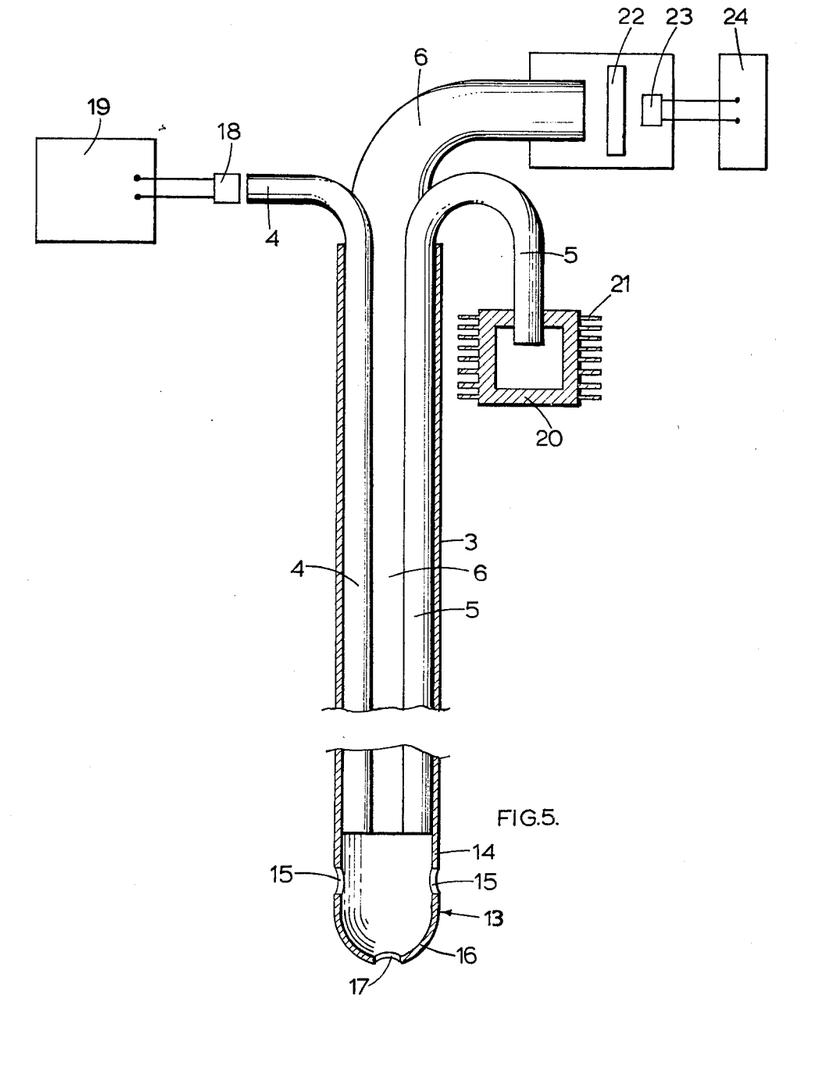
FIG. 5 is a somewhat diagrammatic view of a probe of the form shown in FIG. 4, but to a smaller scale, together with means for generating a beam of radiation, means for absorbing the reflected emergent beam, and means for analysing the scattered radiation.

As shown in FIG. 5, the fibre optics elements 4, 5 and 6 are separated from one another at that end of the probe remote from the head 2. The element 4 is so disposed as to receive radiation from a laser 18 which receives power from a suitable power source 19. The element 5 leads to a closed box 20, the interior surface of which has a coating which absorbs the radiation from the element 5. The box 20 is shown as having fins 21 which serve to assist in the dissipation of the heat energy resulting from the absorption of the reflected radiation. Such a complex arrangement may not always be necessary, particularly where the power output of the laser is relatively small. The third fibre optics element, 6, leads to any suitable type of analyser. That portion of the element 6 from which the elements 4 and 5 have been separated is preferably re-shaped so as to be of circular, rectangular or other relatively simple shape in cross-section. The analyser diagrammatically illustrated in FIG. 5 comprises a filter 22, such as an interference filter, which permits radiation of only a predetermined wavelength or narrow band of wavelengths to pass through it, and a detector 23 responsive to that radiation. Signals from the detector 23 are amplified by a device 24 which may also include means for displaying or recording the intensity of the signals.

A preferred source of radiation is a gallium-arsenide diode laser, or a gallium-aluminium-arsenide diode laser, the power-source 19 providing a pulsed power supply. If desired, however, the source of radiation is a continuously operated laser. This may be, for example, a gallium-arsenide or a gallium-aluminium-arsenide laser as before, a gas-laser, e.g. a helium-neon laser, an ion laser, e.g. an argon ion laser, or a metal vapour laser, e.g. a helium-cadmium laser or a helium-selenium laser. When a continuously operated laser is used the radiation may be passed through a mechanical or optical-electronic chopper so that a discontinuous, intermittent signal is fed to the fibre optics element 4.

The detector 23 may be of any suitable kind. It may, for example, comprise a silicon photodiode, a planar diffused p-i-n silicon photodiode, a Schottky barrier silicon photodiode, a photomultiplier with an S1 type photocathode (that is a silver-oxygen-caesium cathode), a photomultiplier with an extended red multiple alkali photocathode, a photomultiplier with a gallium-arsenide photocathode, or a photomultiplier with a gallium-indium-arsenide photocathode. Where the laser is of a continuously operating type and is other than a gallium-arsenide or gallium-aluminium-arsenide laser the detector 23 may be of any of the kinds mentioned above or may comprise a photomultiplier with a photocathode of some other composition, for example a gallium-arsenide-phosphide, bialkali, multialkali, silver-bismuth-oxygen-caesium, or caesium-antimony photocathode.

The apparatus illustrated in FIG. 5 can be used to detect the presence of a particular substance or to measure the concentration of a particular substance (the intensity of the Raman radiation being proportional to the concentration of the substance giving rise to that radiation).

Figure 6:
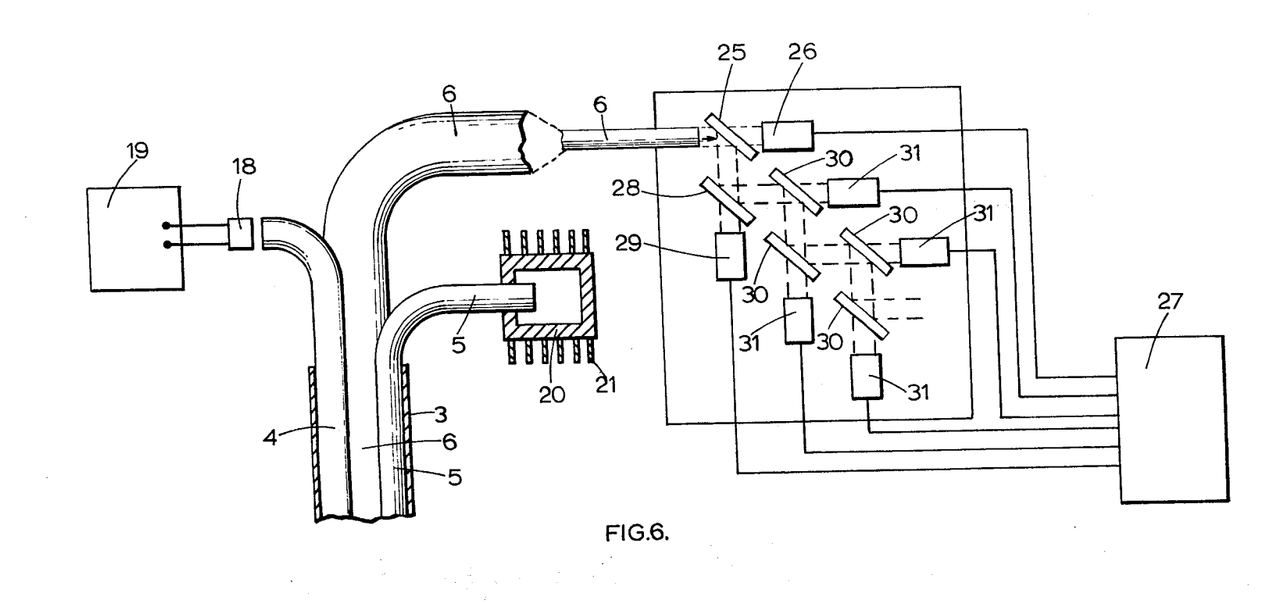
FIG. 6 is a somewhat diagrammatic view similar to the upper part of FIG. 5 but illustrating another means for analysing the scattered radiation, the right hand part of the Figure being to a reduced scale.

If it is desired to detect or measure the concentrations of several different substances a modified form of apparatus may be used, such as that illustrated in FIG. 6. Here the radiation from the fibre optics element 6 is directed onto an interference filter 25 of the narrow band type, set at an angle of 45° to the radiation. Radiation of the wavelength characteristic of the filter 25 passes through the filter and falls on a detector 26, similar to the detector 23, which is connected to a device 27 similar to the device 24. The remaining radiation is directed onto a second filter 28 which is similar to filter 25 though passing radiation of a different wavelength. Radiation passing through the filter 28 falls on a detector 29, similar to the detector 26, which is also connected to the device 27. The remaining radiation is then reflected along a zig-zag path, as illustrated, between a series of further filters 30 each passing radiation of a different wavelength and each having an associated detector 31 connected to the device 27. There may be as few or as many filters 30 and detectors 31 as may be required. For clarity of illustration the angle of inclination of each filter is 45°. In practice, however, the filters would usually be inclined so that the radiation falls on them at a smaller angle to the normal, for example between 10° and 15°.

The detector 23 or each detector 26 may serve merely to produce a signal when the intensity of the radiation to which it responds reaches a predetermined value. This may be considered as a simple form of analysis and thus comes within the scope of the present invention. Alternatively the detector 23 or each detector 26 may be such as to produce a signal which varies in conformity with variations in the concentration of the associated substance in the gap inside the head. The output from the detector or from each detector may be recorded.

Figure 7:
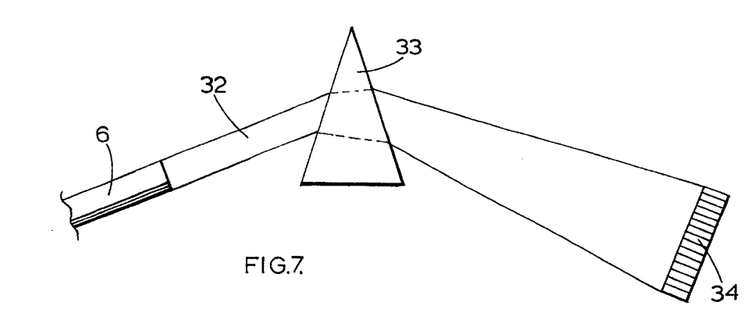
FIG. 7 illustrates diagrammatically a further means for analysing the scattered radiation.

Another possible arrangement is illustrated diagrammatically in FIG. 7. Here the beam of radiation 32 emanating from the fibre optics element 6 falls on a prism 33 which disperses the light onto a detector 34 comprising an array of photosensitive elements. Those elements may, for example, be silicon photodiodes. Radiation of different wavelengths fall on different elements of the detector 34, and the elements may be periodically scanned or sampled in turn to determine whether radiation of each associated narrow range of wavelengths is present, and if so what the intensity of that radiation is. The elements of the detector may be charge-sampled or voltage-sampled. In an alternative arrangement the elements of the detector 34 are replaced by an image dissector photomultiplier tube or a silicon target vidicon tube. If the detector is scanned frequently, for example 100 times per second, the information obtained from the detector can be used to provide a record showing transient changes in the concentration or composition of the fluid being analysed.

Any other suitable arrangement may be used to detect, or analyse the Raman radiation. For example the radiation may be analysed with the aid of a conventional spectrometer incorporating either a prism or a diffraction grating.

Whatever arrangement is used for detecting or analysing the Raman radiation, the intensity of the Raman radiation may be continuously or intermittently compared with the intensity of the Rayleigh light, the latter being proportional to the intensity of the incident radiation of the gap, emanating from the laser, and thus providing an appropriate reference. Alternatively the light issuing from the second fibre optics channel may be used as the reference.

The apparatus may be used for many different purposes. It may, for example, be of use in analysing respiratory gases. For this purpose the probe may be inserted into a patient's lung, and the relative or absolute concentration of such gases as oxygen, nitrogen, carbon dioxide and water vapour may be measured or monitored. If the patient is breathing an anaesthetic gas such as nitrous oxide, the concentration of that may also be measured or monitored. Similarly, the gases in a patient's mouth may also be analysed.

As the apparatus responds very rapidly to changes, apparatus can be used to detect the changes which occur during a single breath.

Figure 8:
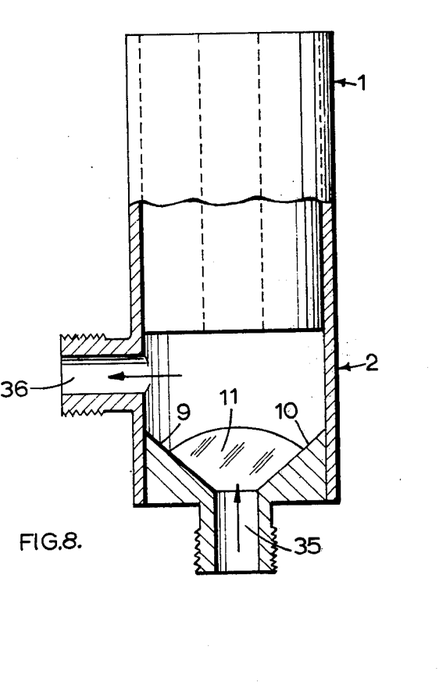
FIG. 8 is a side view, partly broken away, of the head end of a form of probe in which the head is a modification of that shown in FIGS. 1 to 3.
Figure 9:
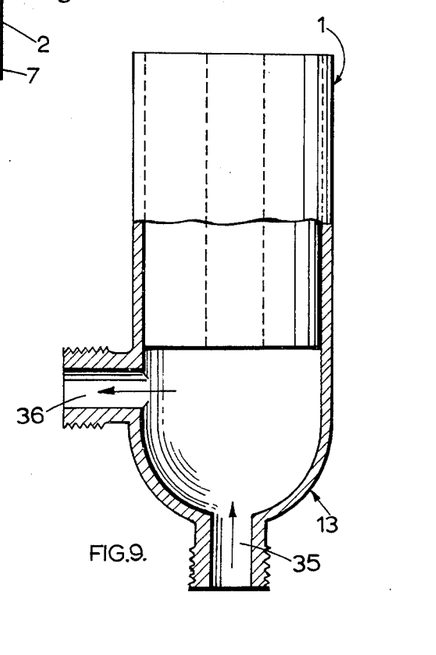
FIG. 9 is similar to FIG. 8, but here the head is a modification of that shown in FIG. 4.

Another use of the apparatus is with chromatographic apparatus, the fluid carrier, whether liquid or gas, being caused to pass through the head. Here again the rapid response-time of the apparatus makes the apparatus particularly suitable for use with gas chromatographic apparatus. Further, although the head may be subjected to thermal stress, and may also shift slightly due to changes in temperature the rugged construction of the head and the flexibility of the body of the probe make it possible for the apparatus to be used without difficulty. The heads illustrated in FIGS. 8 and 9 are intended for use with gas chromatographs, and differ from those illustrated in FIGS. 1 and 4 respectively only in that there is an axial gas inlet 35, at the end of the head, provided with an externally screw-threaded fitment enabling it to be secured to the outlet of the gas chromatograph in a gas-tight manner, and a single gas outlet 36 of similar construction to the gas inlet.

Figure 10:
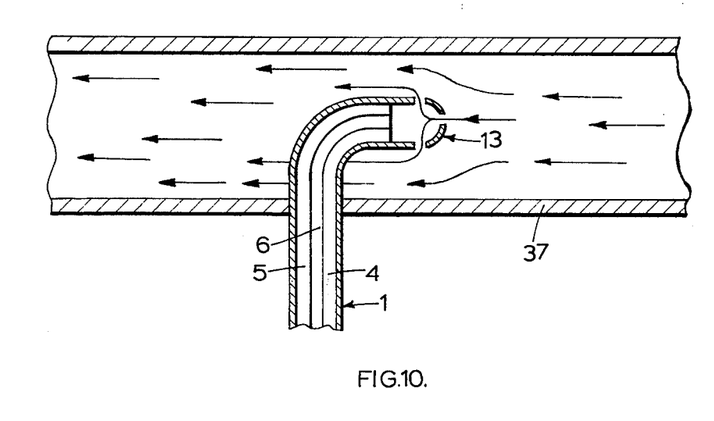
FIG. 10 is a diagrammatic section illustrating a probe of the form shown in FIG. 4 when mounted in a pipeline.

In normal use of the probes illustrated in FIGS. 1 and 4 the fluid to be analysed enters the hole 8 or 17 and leaves through the holes 12 or 15 formed in the cylindrical wall of the head, as indicated by the arrows in that Figure. FIG. 10 shows a head of the kind shown in FIG. 4 mounted in a pipe-line 37 so as to be co-axial with the pipe-line. The direction of flow of the liquid in the pipe-line is again indicated by arrows. It is found that the fluid flowing past the holes 12 or 15 gives rise to a reduction in pressure inside the head which encourages the fluid to flow through the interior of the head. Although the fluid would usually be caused to flow in the direction indicated by the arrows in FIGS. 1, 4 and 10 it would be possible to cause the fluid to flow through the heads in the reverse direction. In other applications the holes 12 or 15 are omitted altogether, and the fluid is allowed to diffuse through the hole 8 or 17 into the interior of the head.

It is to be understood that any of the heads illustrated or described may be used in conjunction with any of the types of analysing means illustrated or described, the particular combination depending on the nature of the fluid to be analysed and the information required.

If there is a danger that the reflective power of the mirrors may be reduced by condensation the head may be heated to prevent condensation. For example an electric heater may be provided in the head, the electric leads for the heater extending lengthwise of the body of the probe.

Numerous other arrangements and modifications are of course possible without departing from the scope of the present invention.

It will be appreciated that in general the invention can provide a relatively simple and robust piece of apparatus enabling fluids to be analysed in positions which are not always easy of access, and by means of a technique employing Raman radiation.

I claim:

1. Apparatus for use in analysing fluids, comprising a source of high intensity radiation of known wavelength, a probe comprising a detecting head and a body of elongated shape extending from the detecting head and incorporating three fibre optics channels extending lengthwise of the body, the first of said channels being so positioned as to receive radiation from said source and to transmit it to a gap at the detecting head which can contain a fluid to be analysed, the radiation being directed across the gap to the second of said channels which is so positioned as to return the radiation from the head, receiving means being provided for receiving and dissipating the energy of the radiation from the second channel, and the third of said channels leading from the head and being positioned to receive Raman radiation scattered by that fluid in the gap, and detector means operative to receive that radiation from said third channel.

2. Apparatus according to claim 1 in which the end of the third channel is to one side of said gap and there is reflecting means elsewhere around the gap operative to reflect Raman radiation from the gap lengthwise of the third channel.

3. Apparatus according to claim 1 in which the fibre optics channels extend through a sheath, part of which sheath constitutes the side wall of the head.

4. Apparatus according to claim 1 in which the detector means comprises means operative to produce a spectrum, a plurality of photoelectric detectors onto which the spectrum can fall so that radiation of different wavelengths falls on different detectors, and scanning means operative periodically to scan the detectors sequentially.

5. Apparatus according to claim 1 in which the detector means comprises an interference filter through which Raman radiation of a known wavelength can pass, and photoelectric means operative to sense that radiation.

6. Apparatus according to claim 5 in which there are a second interference filter, through which Raman radiation of a second known wavelength can pass, and a second photoelectric means operative to sense that radiation, the second filter being so disposed as to receive radiation not passed by the first filter but reflected from the first filter.

7. Apparatus according to claim 1 in which the ends of said first and second fibre optics channel at the head are spaced from one another, and at least part of the adjacent end of said third fibre optics channel being disposed between said ends of said first and second fibre optics channels, reflecting means being provided in the head to direct radiation from the first channel to the second channel.

8. Apparatus according to claim 7 in which the reflecting means is of concave, substantially hemispherical shape.

9. Apparatus according to claim 7 in which each of the first and second fibre optics channels is of circular cross-section, and is embedded in the third fibre optics channel which is of a diameter greater than the sum of the diameters of the first and second channels, part of the third channel extending between the first and second channels.

* * * * *